US012663125B2

(12) United States Patent
Grandadam

(10) Patent No.: US 12,663,125 B2
(45) Date of Patent: Jun. 23, 2026

(54) PORTABLE LIGHTING DEVICE WITH A FLEXIBLE AND DEPLOYABLE LED LIGHTING ELEMENT

(71) Applicant: Promier Products Inc., Peru, IL (US)

(72) Inventor: Cody Duane Grandadam, Peru, IL (US)

(73) Assignee: Promier Products Inc., Peru, IL (US)

( * ) Notice: Subject to any disclaimer, the term of this patent is extended or adjusted under 35 U.S.C. 154(b) by 0 days.

(21) Appl. No.: 19/254,391

(22) Filed: Jun. 30, 2025

(65) Prior Publication Data

US 2026/0002645 A1 Jan. 1, 2026

Related U.S. Application Data

(60) Provisional application No. 63/665,424, filed on Jun. 28, 2024.

(51) Int. Cl.
*F21L 4/02* (2006.01)
*F21L 4/08* (2006.01)
(Continued)

(52) U.S. Cl.
CPC ............... *F21L 4/027* (2013.01); *F21L 4/085* (2013.01); *F21V 14/025* (2013.01); *F21V 19/003* (2013.01); *F21V 21/0885* (2013.01); *F21V 21/0965* (2013.01); *F21V 33/0008* (2013.01); *F21V 23/007* (2013.01);
(Continued)

(58) Field of Classification Search
CPC .............. F21Y 2115/10; F21Y 2103/00; F21Y 2103/10; F21Y 2103/20; F21Y 2103/30; F21Y 2103/33; F21Y 2103/37; F21V 33/0008; F21V 21/08; F21V 21/0808; F21V 21/0816; F21V 21/0824; F21V 21/0832; F21V 21/084; F21V 21/088; F21V 21/0885; F21V 21/092; F21V 21/0925; F21V 21/096; F21V 21/0965; F21S 4/22; F21L 4/00; F21L 4/005; F21L 4/02;
(Continued)

(56) References Cited

U.S. PATENT DOCUMENTS 10,645,987 B2 * 5/2020 Maldonado ............ H05B 47/11
11,175,009 B1 * 11/2021 Ho ........................ F21V 23/045
(Continued)

*Primary Examiner* — Robert J May
(74) *Attorney, Agent, or Firm* — Barnes & Thornburg LLP

(57) ABSTRACT

A portable lighting device capable of being used in multiple use configurations, defined by distinct positions and distinct states, to provide the user of the lighting device with greater operating flexibility, including the ability to be worn on an article of clothing. The portable lighting device includes a housing having an integral securement recess, an adjustable, deployable lighting element including a flexible LED array affixed to a flexible backing support member, and a coupling support extending from a central portion and that is pivotably coupled to the front portion of the housing. An electronics package includes a power source contained within the housing and operably coupled to said lighting element. An attachment means extends from the housing and is adapted to removably connect with an article of closing worn by a user of the device. Depending upon the particular need for illumination, the lighting element can be adjusted and deployed into a variety of states and positions.

22 Claims, 13 Drawing Sheets

(51) Int. Cl.
*F21V 14/02* (2006.01)
*F21V 19/00* (2006.01)
*F21V 21/088* (2006.01)
*F21V 21/096* (2006.01)
*F21V 33/00* (2006.01)
*F21V 23/00* (2015.01)
*F21V 23/04* (2006.01)
*F21Y 103/37* (2016.01)
*F21Y 115/10* (2016.01)

(52) U.S. Cl.
CPC ....... *F21V 23/0407* (2013.01); *F21V 23/0414* (2013.01); *F21Y 2103/37* (2016.08); *F21Y 2115/10* (2016.08)

(58) Field of Classification Search
CPC . F21L 4/022; F21L 4/025; F21L 4/027; F21L 4/04; F21L 4/045; F21L 4/06; F21L 4/08; F21L 4/085
See application file for complete search history.

(56) References Cited

U.S. PATENT DOCUMENTS 11,300,278 B2 * 4/2022 Hur .......................... F21L 4/027
2010/0289433 A1 * 11/2010 Lau ...................... F21V 21/0885
362/106

* cited by examiner

PORTABLE LIGHTING DEVICE WITH A FLEXIBLE AND DEPLOYABLE LED LIGHTING ELEMENT

CROSS-REFERENCE TO RELATED APPLICATIONS

This application claims priority under 35 U.S.C. § 119(e) to U.S. Provisional Application No. 63/665,424, filed Jun. 28, 2024, which is expressly incorporated by reference herein.

TECHNICAL FIELD

This disclosure relates to a portable lighting device capable of being used in multiple use configurations, defined by distinct positions and distinct states, to provide the user of the lighting device with greater operating flexibility, including the ability to worn on an article of clothing. The portable lighting device generally includes a housing with an electronics package, an adjustable and deployable lighting element with a flexible LED array affixed to a flexible backing support member and attachment means adapted to be removably affixed to an article of clothing. As a result, these components interact to provide the lighting element with 2 degrees of adjustment freedom during operation and usage of the inventive portable lighting device.

BACKGROUND

Existing lighting products enable a wide range of indoor, outdoor, and nighttime activities. Portable lighting sources, such as flashlights or lanterns, have been developed to provide illumination in varied locations and situations. However, such portable lighting sources can be difficult to orient when not held by a user. In the event that a user needs hands-free lighting, other methods of orienting the portable lighting system are needed.

Accordingly, there is an unmet need for a portable lighting device, such as a wearable lighting device, which can be attached to an item of clothing with a light source positioned for the need of the user and can be stored and carried in a compact form.

Also, there is an unmet need for a portable lighting device that can be removably attached, by hand, to a support surface to illuminate a desired area, and then promptly removed or detached from that support surface, by hand, once illumination is no longer needed to allow the user to return the device to a stored, non-use position. A full discussion of the features and advantages of the present invention is deferred to the following detailed description, which proceeds with reference to the accompanying drawings.

SUMMARY

In general, this document describes a wearable light with at least one deployable, pivotally adjustable, flexible LED lighting element affixed to a deployable, flexible panel; a housing and an integrated attachment mechanism to attach the wearable light to an item, such as a hat, shirt, pants, or other wearable or non-wearable item. The flexible LED element and a coupling mechanism pivotably connect the LED lighting element to the housing and the attachment mechanism. As a result, these components interact to provide the lighting element with 2 degrees of adjustment freedom during operation and usage of the inventive wearable light.

In an example embodiment, a portable lighting device includes a housing including a top wall, a bottom wall, a front portion, a rear portion opposite the front portion, and opposed side portions extending between the front and rear portions, each side portion including a securement recess, an adjustable, deployable lighting element including (i) a flexible LED array affixed to a flexible backing support member and (ii) a coupling support extending from a central portion of the flexible backing support member, wherein the coupling support is pivotably coupled to the front portion of the housing, an electronics package including a power source contained within the housing and operably coupled to said lighting element, an attachment means coupled to the housing, wherein the attachment means is adapted to connect with a brim of a hat worn by a user of the portable lighting device, and wherein in a retracted position, end portions of said lighting element are received in respective securement recesses of the housing to define a compact state $S_C$.

Various embodiments can include some, all, or none of the following features. In the compact state $S_C$, end portions of both the LED array and the flexible backing support member can be received in respective securement recesses of the housing. Said lighting element can be deployable by the user from the compact state $S_C$ to a first deployed state $S_{D1}$, wherein the end portions of said lighting element are removed from the securement recesses and said lighting element is deployed into a substantially linear configuration. In the first deployed state $S_{D1}$, the lighting element can be pivotably adjustable between an initial angular position and a fully pivoted angular position, wherein in the initial angular position, the lighting element directs emitted light substantially forward and in the fully pivoted angular position, the lighting element directs emitted light substantially downward. A pivot angle of approximately 90 degrees can be defined between the initial angular position and the fully pivoted angular position. Said lighting element can be deployable by the user from the compact state $S_C$ to a second deployed state $S_{D2}$, wherein the end portions of said lighting element are removed from the securement recesses and said lighting element is deployed into a curvilinear configuration. In the second deployed state $S_{D2}$, the lighting element is pivotable between an initial angular position and a fully pivoted angular position, wherein in the fully pivoted angular position the lighting element directs emitted light substantially downward. A pivot angle of approximately 90 degrees can be defined between the initial angular position and the fully pivoted angular position. The flexible LED array can include Chip on Board ("COB") light emitting diodes. The portable lighting device can include a USB charging port located in the rear portion of the housing and operably coupled to the power source. The rear portion of the housing can include at least one magnet configured to removably affix the portable lighting device to a support surface, and wherein the rear portion also includes a removable cover that encloses both of the USB charging port and at least one magnet.

In another example embodiment, a portable lighting device can be removably affixed to an article of clothing worn by a user, the lighting device including a housing including: (i) a top wall, (ii) a bottom wall, (iii) a front portion, (iv) opposed side portions extending between the top and bottom walls, and (v) an electronics package including a power source, a flexible LED lighting element operably connected to the power source, said lighting element including a pivotable coupling support extending from a central portion of said lighting element, wherein the coupling support is pivotably coupled to the front portion of the housing, an attachment means coupled to the housing, wherein the attachment means is adapted to be removably affixed to an article of clothing, such as a hat or shirt, worn by a user of the portable, wearable lighting device, wherein in a retracted position, a first end portion of said lighting element is received in a first securement recess in a first side portion of the housing, and a second end portion of said lighting element is received in a second securement recess in a second side portion of the housing, to collectively define a compact state $S_C$, and, wherein said lighting element and the pivotable coupling support provide the lighting device with two degrees of freedom of adjustment during operation of the lighting device.

Various embodiments can include some, all, or none of the following features. In the compact state $S_C$, an intermediate portion of said lighting element can be received within a frontal securement recess formed in the front portion of the housing. In the compact state $S_C$, said lighting element has a substantially U-shaped configuration when observed in top view of the portable, wearable lighting device. Said lighting element can be deployable by the user from the compact state $S_C$ to a first deployed state $S_{D1}$, wherein the first and second end portions of said lighting element are removed from the first and second securement recesses. In the first deployed state $S_{D1}$, said lighting element is pivotably adjustable between an initial angular position and a fully pivoted angular position, wherein in the fully pivoted angular position, the lighting element directs emitted light substantially downward. A pivot angle of approximately 90 degrees can be defined between the initial angular position and the fully pivoted angular position. Said lighting element can include a flexible LED array affixed to a flexible backing support member that substantially retains its configuration after a user applies a deformation force to the lighting element, and wherein the coupling support (i) extends from a central portion of the flexible backing support member, and (ii) is pivotably coupled to a cavity formed in the front portion of the housing. The cavity can be aligned with a frontal securement recess formed in the front portion of the housing, and wherein in the compact state $S_C$, an intermediate portion of said lighting element is received within the frontal securement recess. The flexible LED array can include Chip on Board ("COB") light emitting diodes. The portable, wearable lighting device can include a USB charging port located in the rear portion of the housing and operably coupled to the power source. The rear portion of the housing can include at least one magnet configured to removably affix the wearable lighting device to a support surface, and wherein the rear portion also includes a removable cover that encloses both of the USB charging port and the at least one magnet.

The details of one or more implementations are set forth in the accompanying drawings and the description below. Other features and advantages will be apparent from the description and drawings, and from the claims.

BRIEF DESCRIPTION OF THE DRAWINGS

The drawing figures depict one or more implementations in accord with the present teachings, by way of example only, not by way of limitation. In the figures, reference numerals refer to the same or similar elements.

Figure 1:
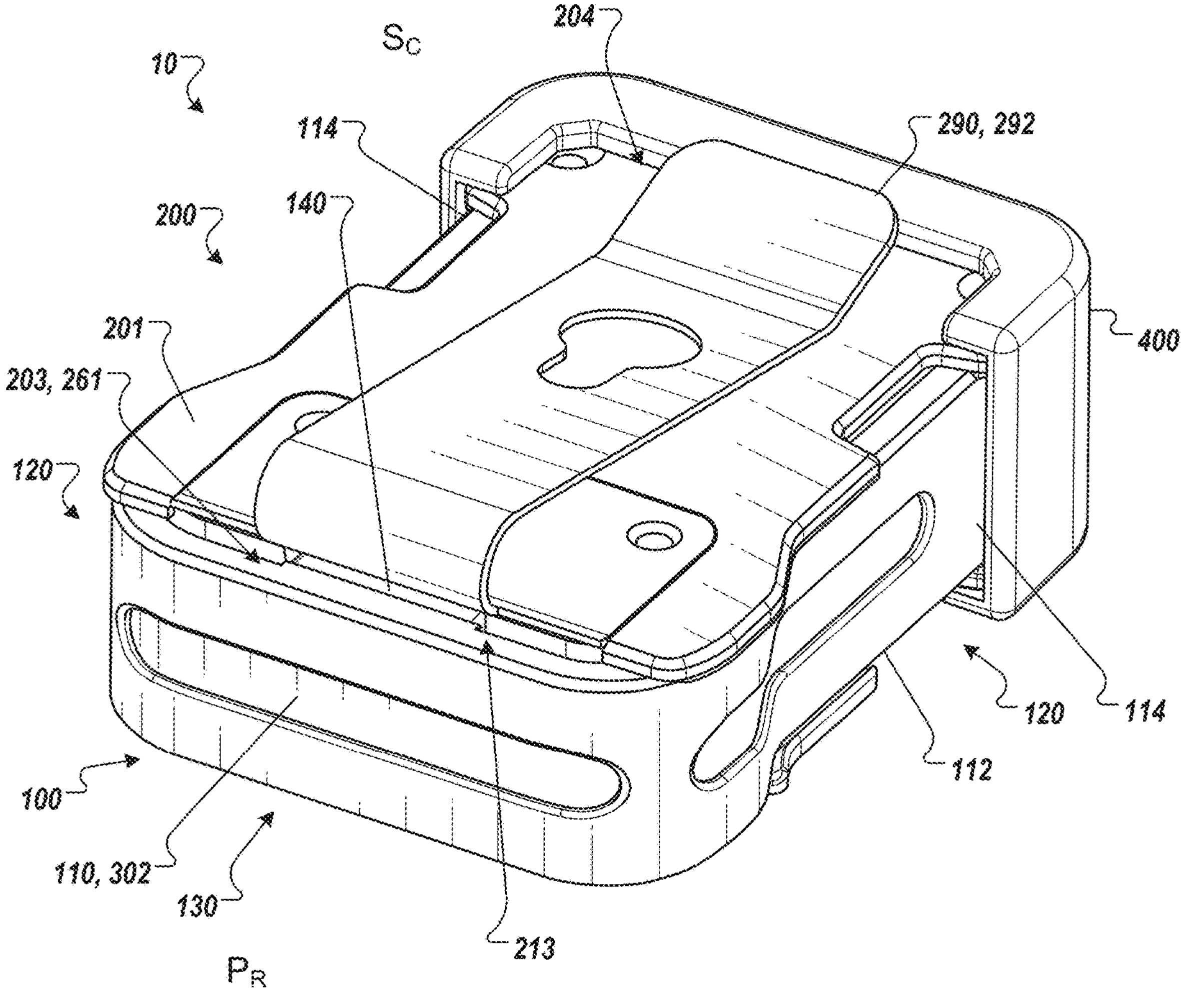
FIG. 1 is a front perspective view of a portable, wearable lighting device with a deployable, flexible LED lighting element including a plurality of elongated, flexible panels, and an attachment mechanism oriented upward, showing the lighting element and the panels in a retracted position PR to define a compact state $S_C$.
Figure 2:
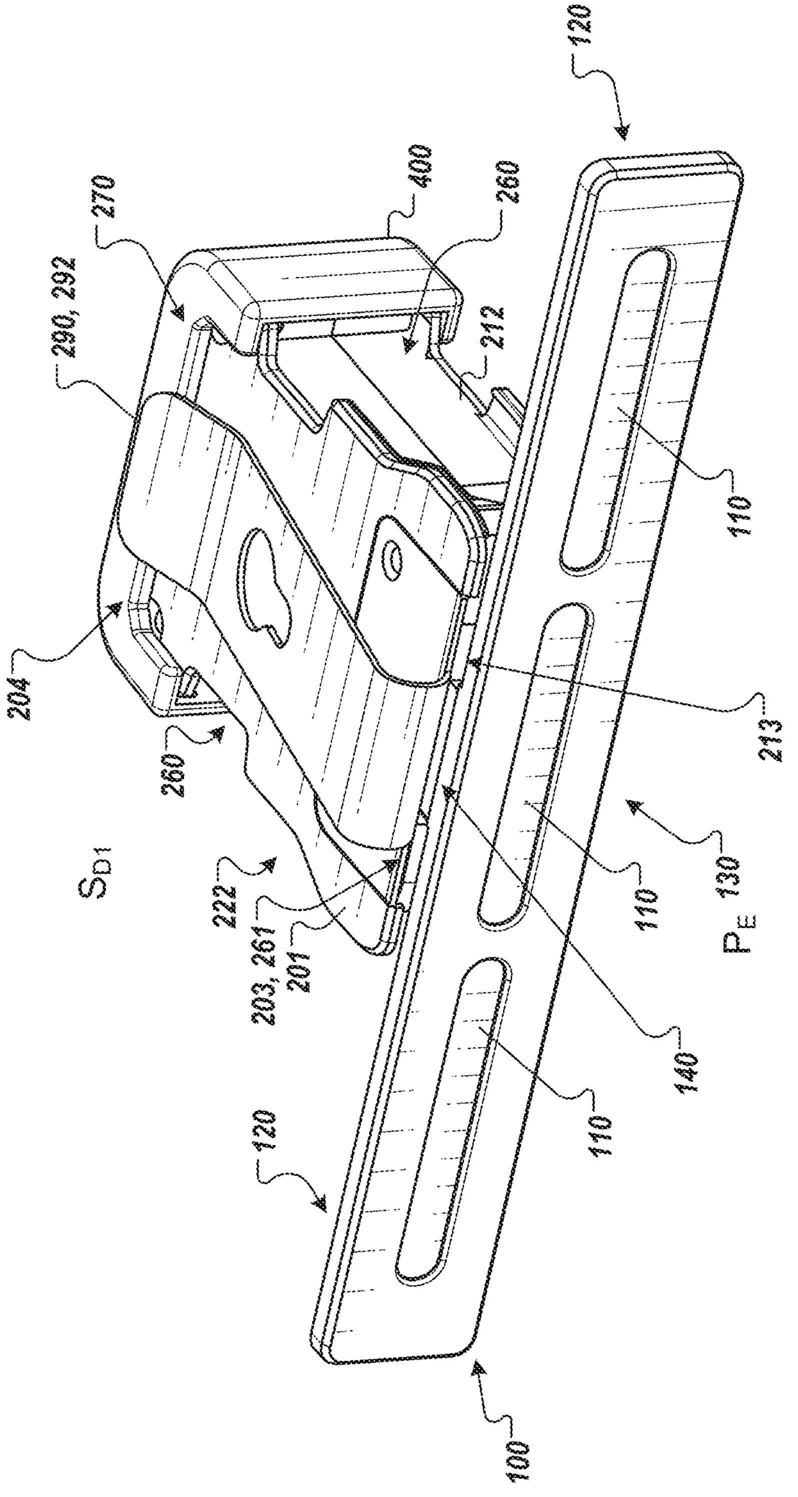
FIG. 2 is a front perspective view of the portable, wearable lighting device of FIG. 1, showing the lighting element and the panels in an extended, initial angular position PE to define a first deployed state $S_{D1}$ where the lighting element has a substantially linear configuration.
Figure 3:
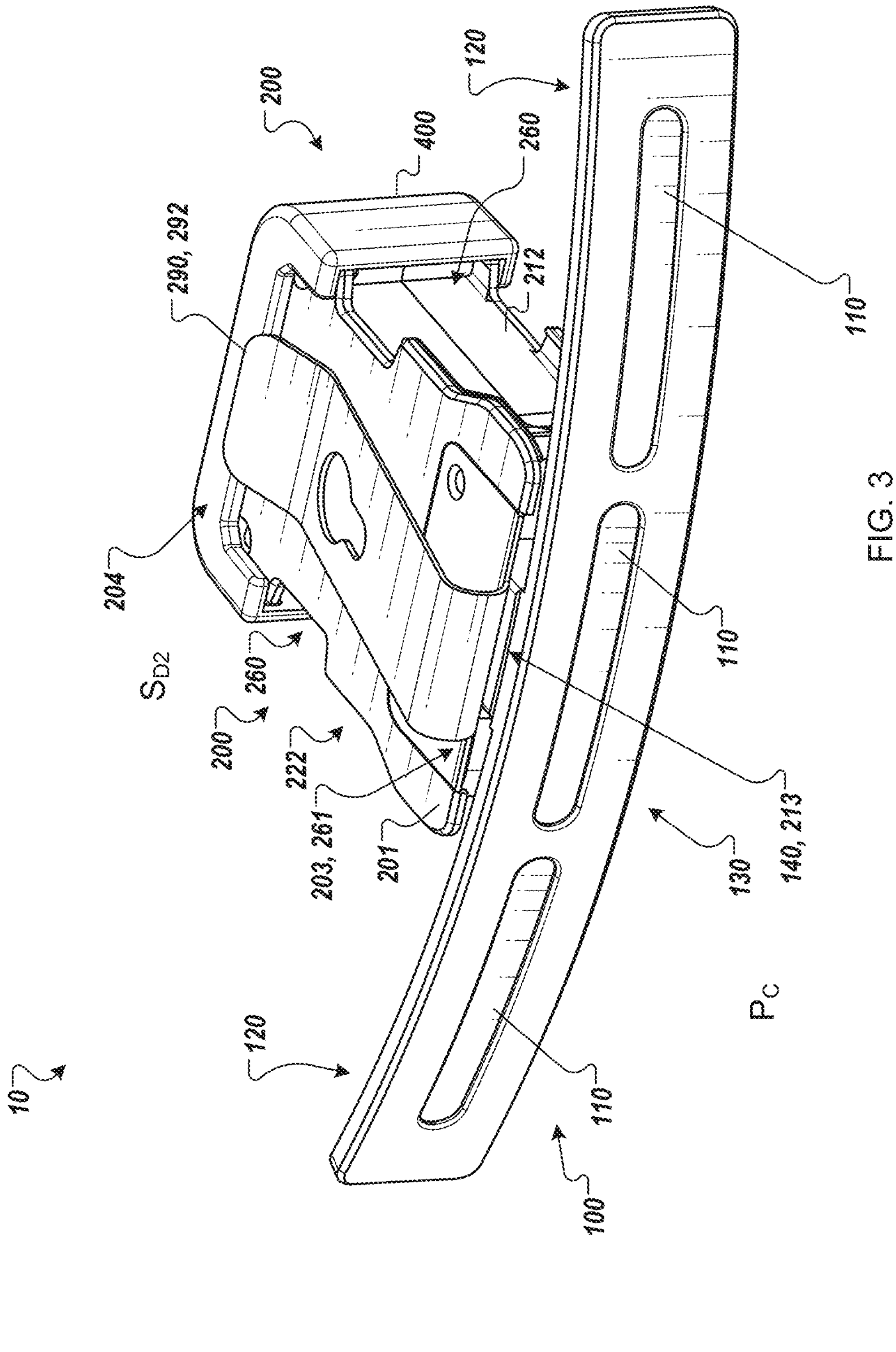
FIG. 3 is a front perspective view of the portable, wearable lighting device of FIG. 1, showing the lighting element and the panels in a curvilinear position PC to define a second deployed state $S_{D2}$ where the lighting element has a substantially curvilinear configuration.

While the invention will be described in connection with the preferred embodiments shown herein, it will be understood that it is not intended to limit the invention to those embodiments. On the contrary, it is intended to cover all alternatives, modifications, and equivalents, as may be included within the spirit and scope of the invention as defined by the appended claims.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present disclosure.

While this disclosure includes a number of details and embodiments in many different forms, there is shown in the drawings and will herein be described in detail particular embodiments with the understanding that the present disclosure is to be considered as an exemplification of the principles of the disclosed methods and systems, and is not intended to limit the broad aspects of the disclosed concepts to the embodiments illustrated.

Overview

FIGS. 1-9 show a portable lighting device 10 that includes an adjustable, flexible, deployable lighting element 100 pivotably coupled to a housing 200 having a top wall 201, a bottom wall 202, a front portion 203, a rear portion 204 opposite the front portion 13, an opposed side portions configured as side walls 212 and 222 extending between the front portion 203 and the rear portion 204. The adjustable lighting element 100 includes at least one Chip on Board ("COB") light emitting diode (LED) array 110 affixed to a deployable, flexible support or backing panel 120 that includes a central panel portion 130 fixed to a coupling portion 140 that is configured as a coupling support. The coupling portion 140 is configured to operably connect the adjustable lighting element 100 to the housing 200 within a cavity 213 of the housing 200. The wearable lighting device 10 includes an electronics package 300 contained within the housing 200. The electronics package 300 includes at least a power source 320 operably coupled to the LED array 110 and a switch 330 to control light emitted from the lighting element 100. The switch 330 is covered and protected by a button 332 arranged on the top wall 201. The wearable lighting device 10 may also include a USB charging port 340 in the housing 200 and operably coupled to the power source 320. The wearable lighting device 10 includes attachment means 290 joined to the bottom wall 202 and adapted to connector or be removably attached to a wearable item (e.g., hat, shirt, pants, shorts, clothing, other wearable or non-wearable items). Additionally, the wearable lighting device 10 can operate in a detached standalone mode (e.g., positioned on or secured to a support surface) or held in a hand of the user.

Figure 4:
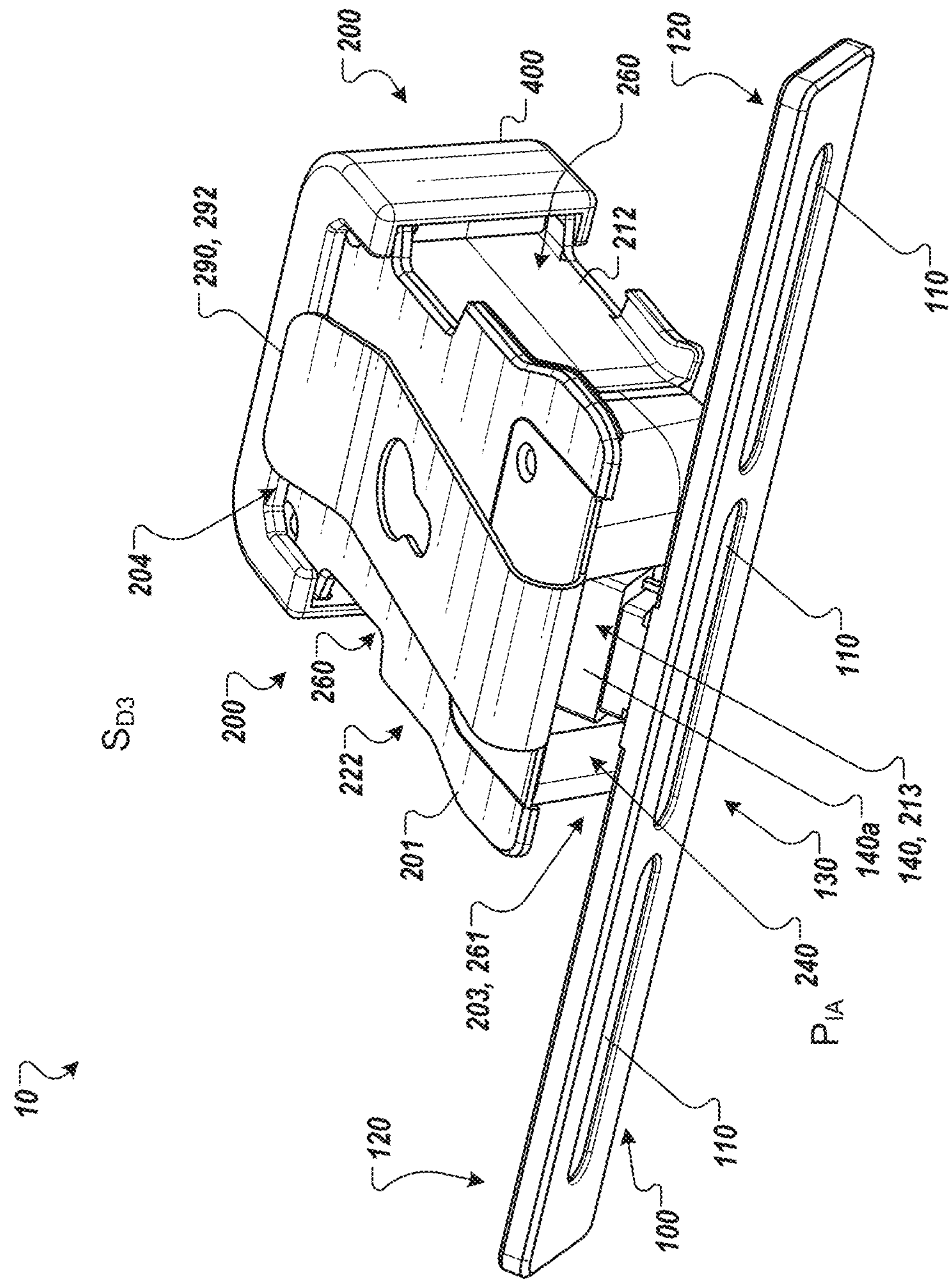
FIG. 4 is a front perspective view of the portable, wearable lighting device of FIG. 1, showing the lighting element and the panels in an intermediate pivoted angular position PIA to define a third deployed state $S_{D3}$.
Figure 5:
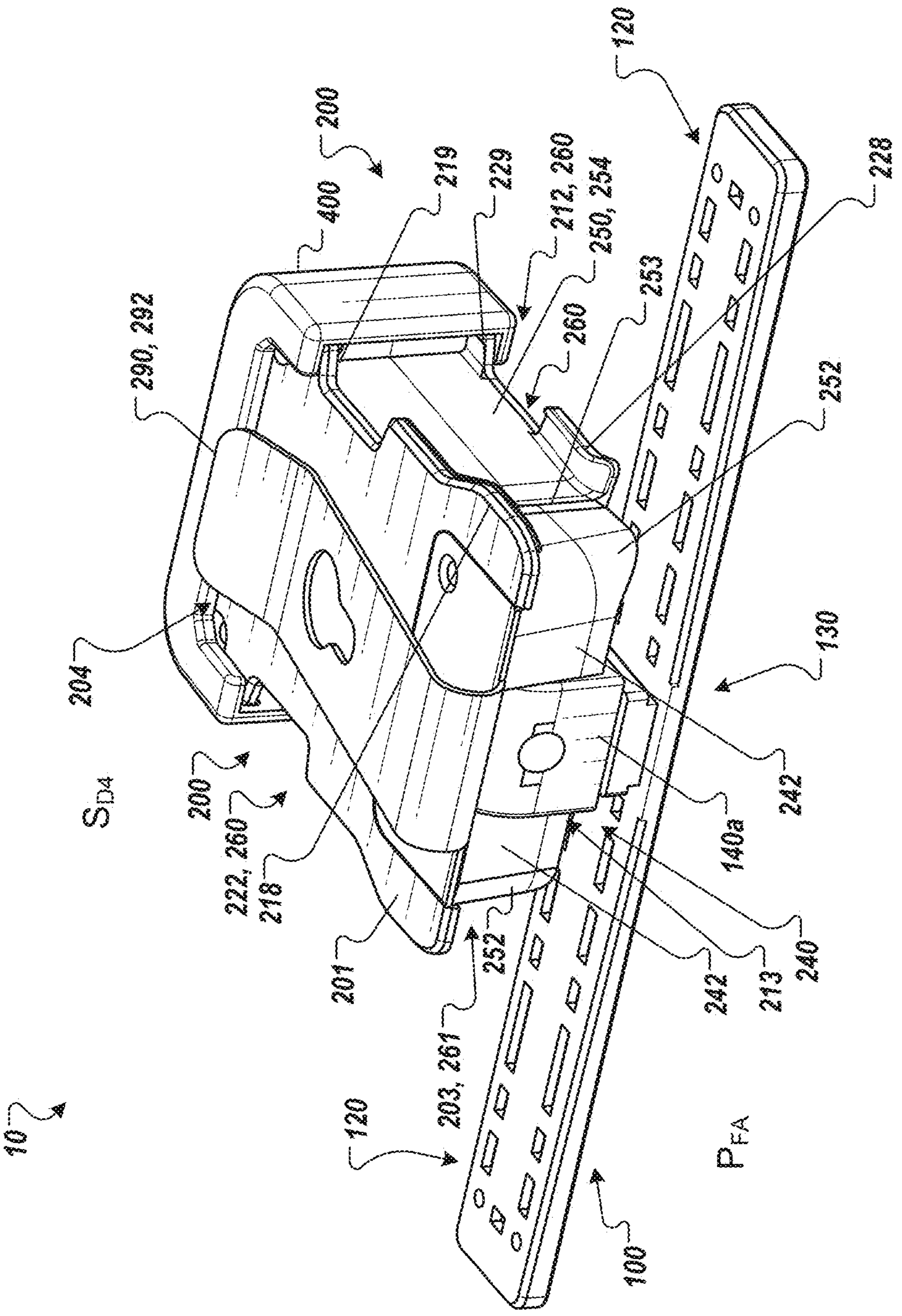
FIG. 5 is a front perspective view of the portable, wearable lighting device of FIG. 1, showing the lighting element and the panels in a fully pivoted angular position PFA to define a fourth deployed state $S_{D4}$.
Figure 6:
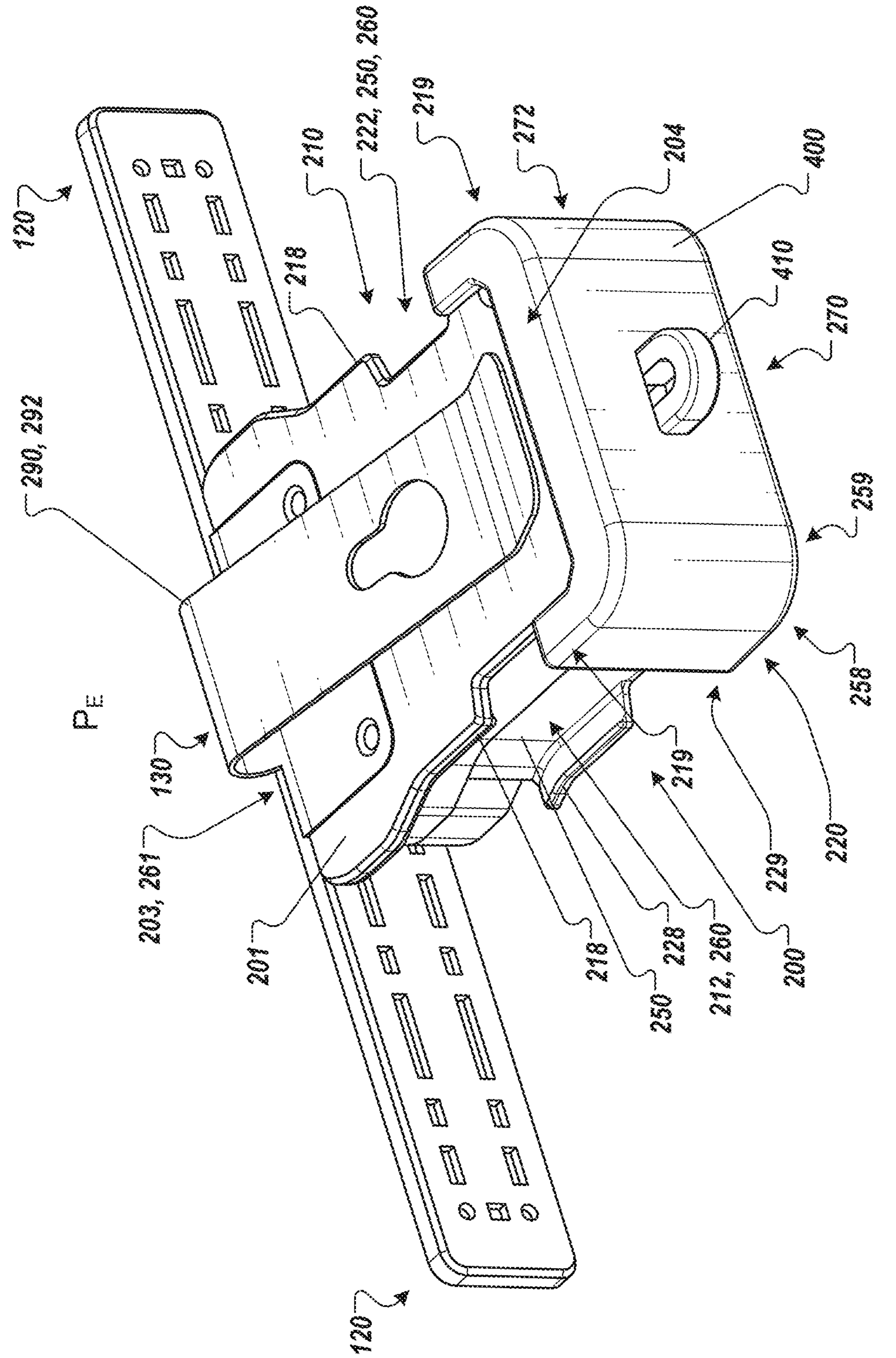
FIG. 6 is a rear perspective view of the portable, wearable lighting device of FIG. 1, showing the lighting element and the panels in the extended position PE and the removable cover attached to the main body of the wearable light.
Figure 7:
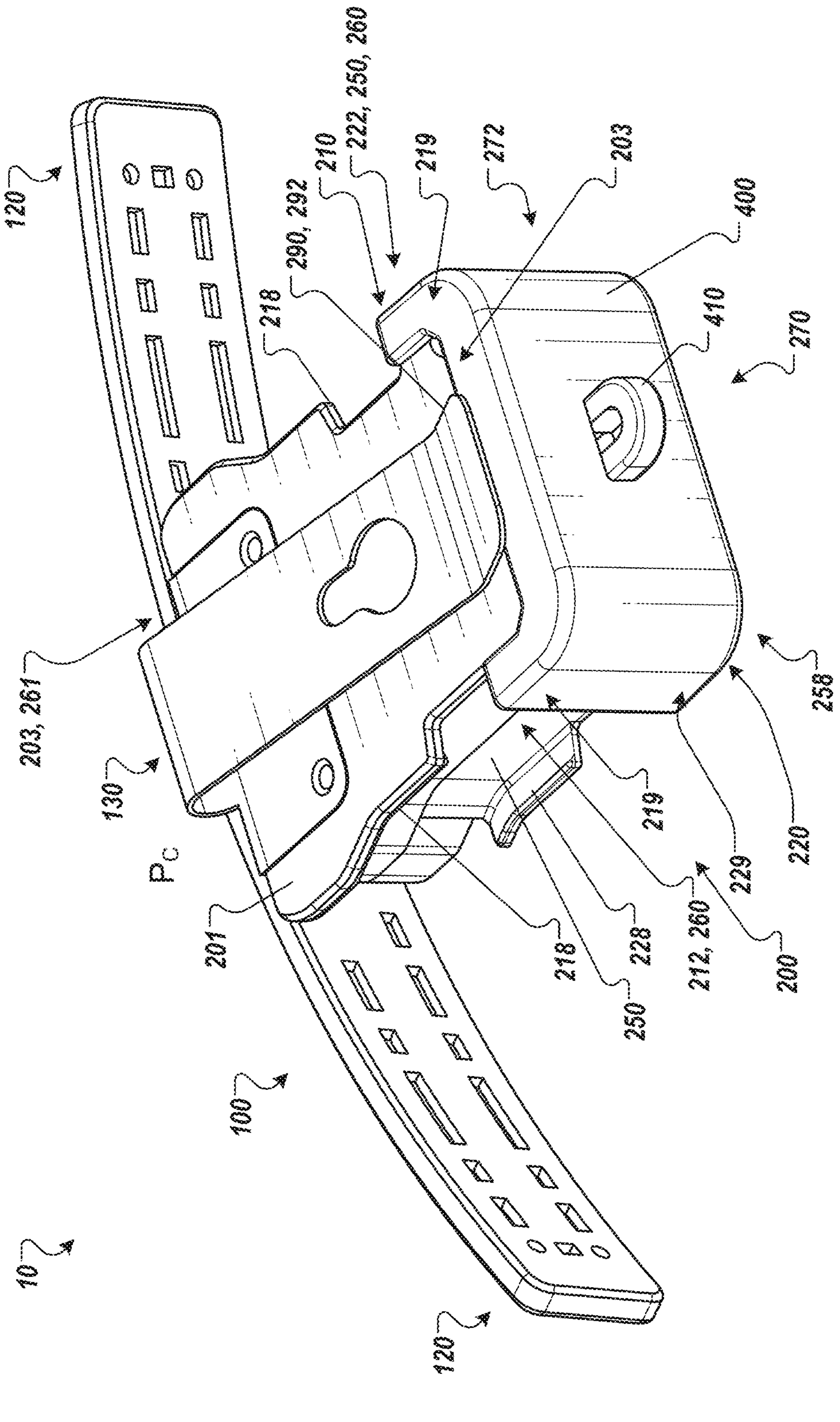
FIG. 7 is a rear perspective view of the portable, wearable lighting device of FIG. 1, showing the lighting element and the panels in the curvilinear position PC.

As explained below, the adjustable, flexible, deployable lighting element 100, the LED array and the support panel 120 of the wearable lighting device 10 are configured to be (i) collapsed to a retracted position abutting the housing 200, and/or (ii) deployed to extend outward from the housing 200, whereby the position of lighting element 100 is adjustable to direct the light provided by the LED array 110. The wearable lighting device 10 is configured to be carried or stored in with the adjustable lighting element 100 in a retracted position or compact state $S_C$ (FIG. 1). In the compact state $S_C$, the lighting element 100 has a substantially U-shaped configuration when observed in top view of the portable, wearable lighting device 10. The adjustable lighting element 100 can deployed to a first deployed state $S_{D1}$ (FIGS. 2, 5, 9), where opposed end portions of the flexible lighting panel 120 extend outward from the housing 200, and pivoted through a range of pivot angles including an intermediate angled position or second deployed state $S_{D2}$ (FIG. 3), to a fully pivoted or third deployed state $S_{D3}$ (FIG. 4). The wearable lighting device 10 can also be utilized in a partially deployed state SPD (FIGS. 6-8), including during charging of the internal power source 320. In operation, the flexible lighting element 100 can pivot relative to the housing 200 as a first degree of freedom, and the lighting element 100 can be flexed and bent to extend and retract relative to the housing 200 in at least a second degree of freedom. As such, the lighting element 100 and the pivotable coupling portion 140 provide the lighting device 10 with two degrees of freedom of adjustment during operation of the lighting device 10.

Housing

As shown in FIGS. 1-9, the housing 200 of the wearable lighting device 10 comprises a first body 210 and a second body 220 configured to be coupled to enclose the electronics package 300. The first body 210 having a first face wall 212 and the second body 220 having a second face wall 222. The first body 210 includes a first face wall 212 with a substantially planar outward facing surface and a curvilinear rim 215 extending from an opposite inward facing surface. Similarly, the second body 220 includes a second face wall 222 with a substantially planar outward facing surface, and a second curvilinear rim complementary to the first curvilinear rim 215 and extending from an opposite inward facing surface. Said first and second face walls 212, 222 are arranged substantially parallel to each other. The first and second bodies 210, 220 configured to couple to each other such that curvilinear rims 215, 225 mate to define a periphery having an arrangement of edge walls 230 and between the first and second face walls 210, 220. The first and second face walls 212, 222 having the same or different shapes including flange portions 218, 219, 228, 229 on opposing sides that extend past the periphery defined by the arrangement of edge walls 230. The flange portions 218, 219 of the first wall and flange portions 228, 229 of the second face wall 220 defining, at least in part, securement recesses 260 formed in the sides of the housing 200 and securement recesses 261 defined in the front portion 203 of the housing 200. The frontal securement recess 261 and the securement recessed 260 are collectively aligned along a periphery of the housing 200.

Figure 9:
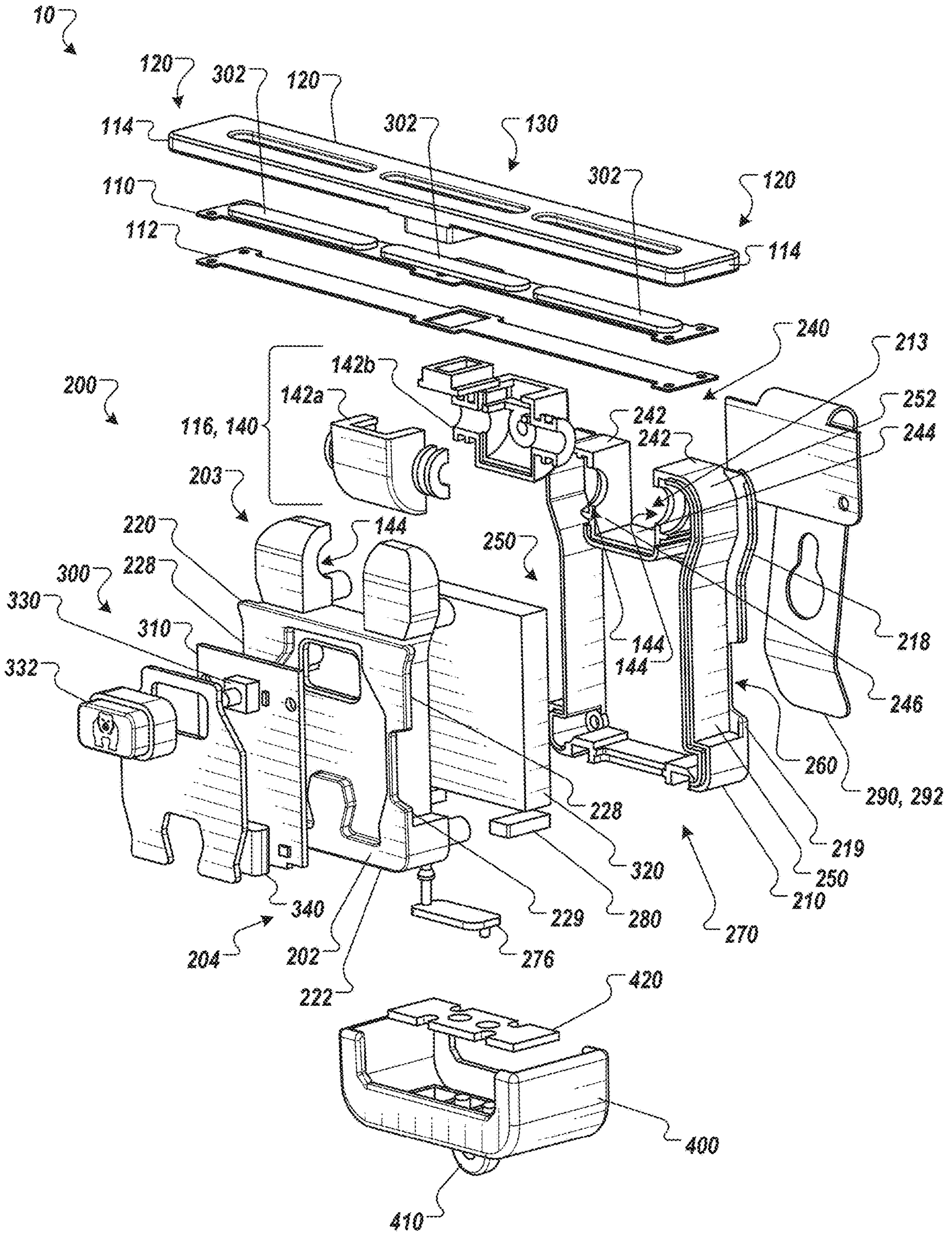
FIG. 9 is a first exploded view of the of the portable, wearable lighting device of FIG. 1.
Figure 10:
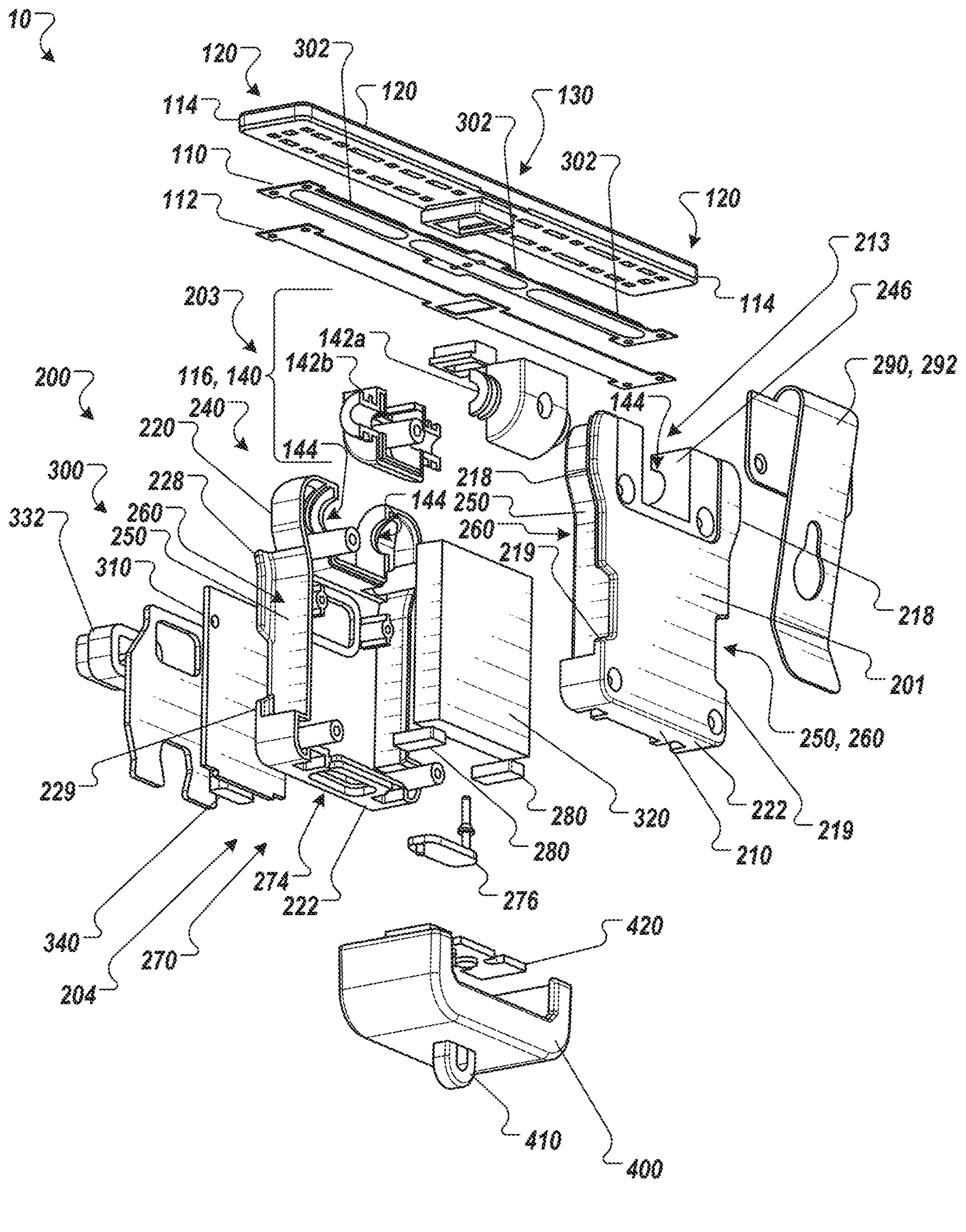
FIG. 10 is a second exploded view of the portable, wearable lighting device of FIG. 1.
Figure 11:
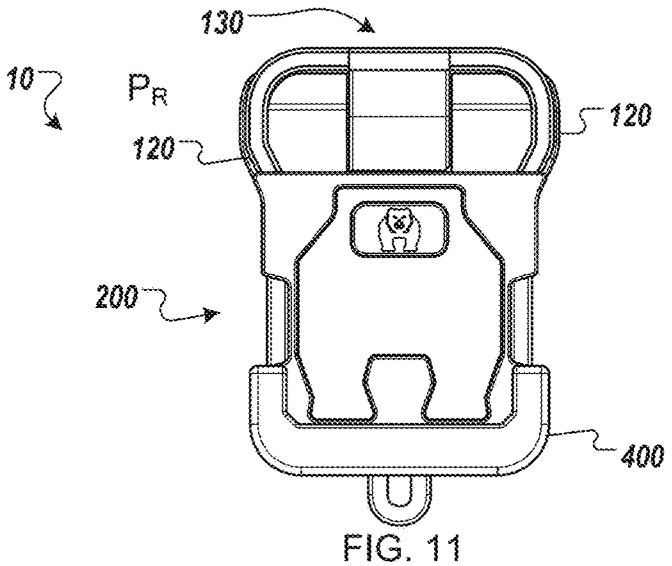
FIG. 11 is a top view of the portable, wearable lighting device of FIG. 1, showing the device in the retracted position PR.
Figure 12:
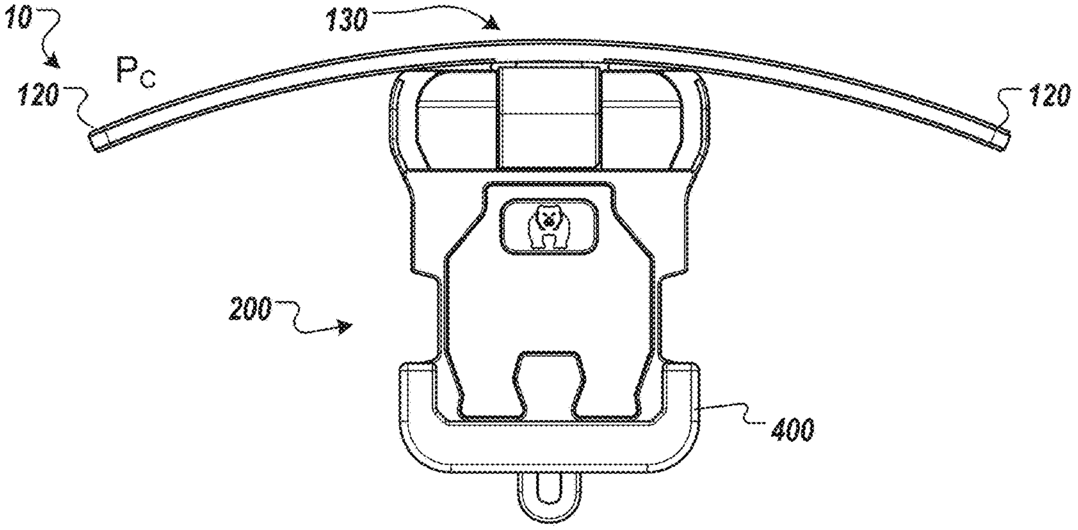
FIG. 12 is a top view of the portable, wearable lighting device of FIG. 1, showing the device in the curvilinear position PC.
Figure 13:
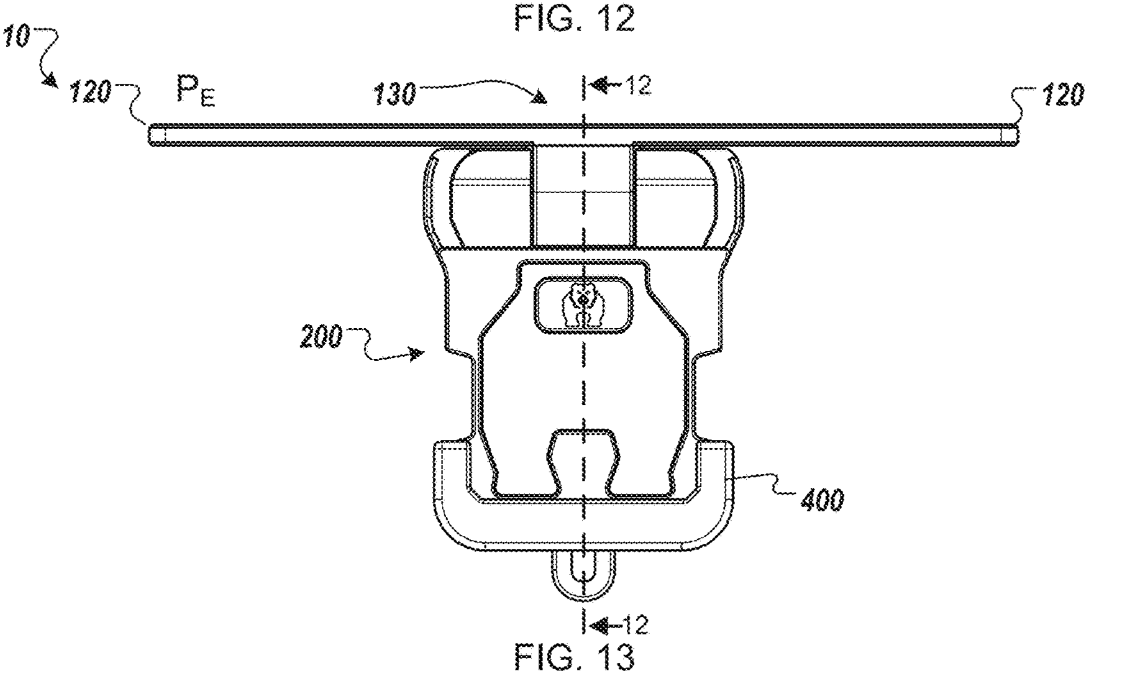
FIG. 13 is a top view of the portable, wearable lighting device of FIG. 1, showing the device in the extended position PE.
Figure 14:
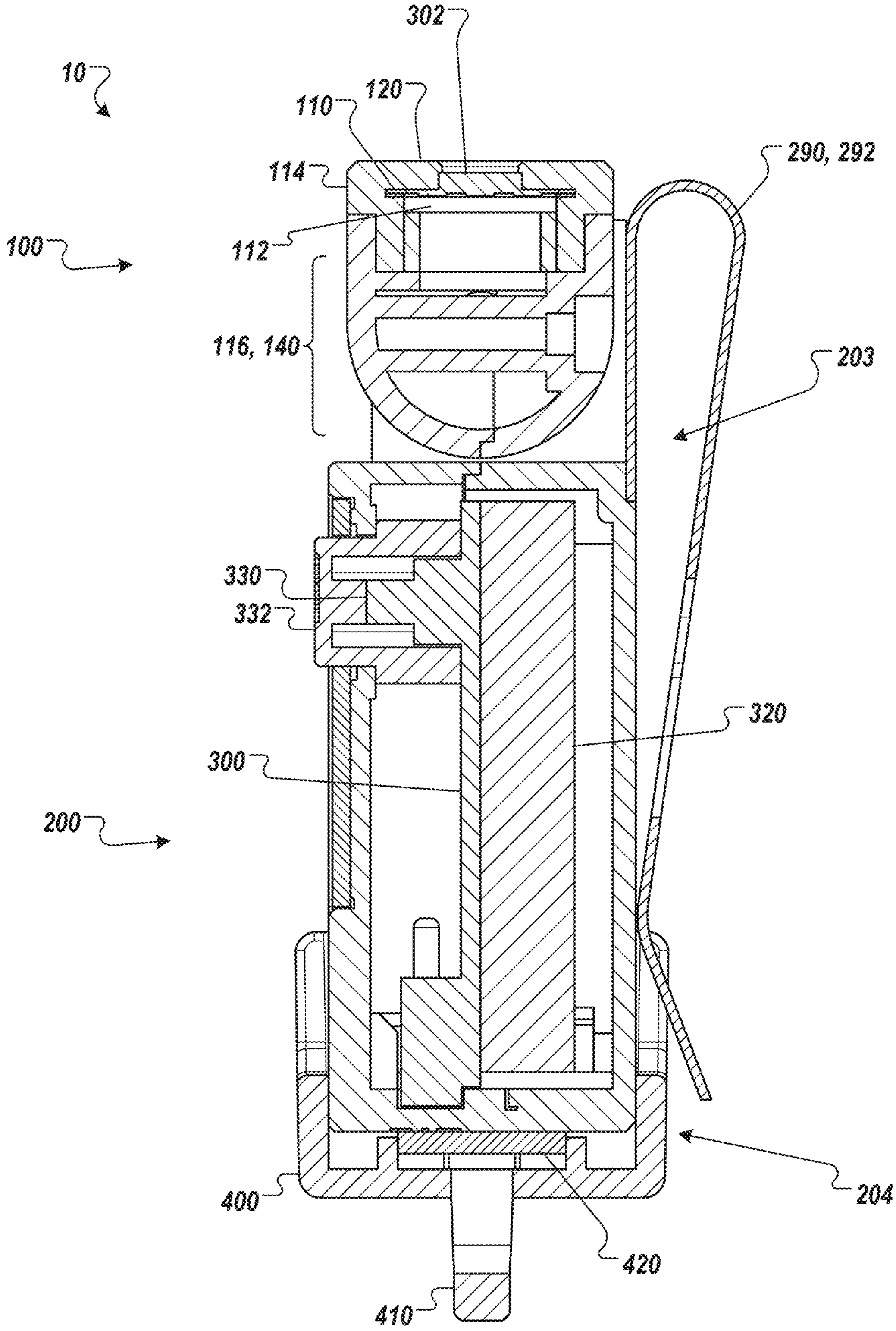
FIG. 14 is a cross-sectional view of the wearable, deployable light of FIG. 1, taken along line 12-12 of FIG. 13.

The arrangement of edge walls 230 includes a front portion 240, an opposing base portion 270, and side edge walls 250 extending there between. The front portion 240 includes a cavity 213 separating two front edge walls 242, where the cavity 213 is aligned with the frontal securement recess 261 and includes a front facing middle wall 244 and two recess walls 246 extending forward to the two front edge walls 242. The two front edge walls 242 being substantially in the same plane and the front facing middle wall 244 spaced back and substantially parallel to the two front edge walls 242. The two recess walls 246 can be substantially parallel to each other and substantially perpendicular to the two front edge walls 242 and the front facing middle wall 244. The two side edge walls 250 are curvilinear and include front rounded corners 252 as transition from each of the front edge walls 242, a curved transition 253 to a substantially flat portion 254 at least partially recessed from the flange portions 218, 219, 228, 229 of the first and second face walls 212, 214 and defining the securement recesses 260. As shown in FIGS. 9 and 10, the two side edge walls 250 also include a stepped portion 256 having a lateral wall 257 and side base wall 258. The base edge wall 272 extends between the two side base walls 258 and can include a curved transition at the base corners 259.

A charging port 340 can be positioned for access through a base receptacle 274 in the base edge wall 272. The housing 200 may include a cover 276 to cover the base receptacle 274 when not in use, providing additional protection to the enclosure. The charging port 340 may be recessed in the base receptacle 274 and the cover 276 may fit substantially within the base receptacle 274 to maintain a flush surface along the base edge wall 272, such that the wearable lighting device 10 can be positioned to stand alone on a flat surface. The wearable lighting device 10 is operable as a light and the lighting element 100 can be positioned whether attached to an item by the attachment means 290 or positioned on a surface standing on the base edge wall 272 or other surface.

The housing 200 may be formed from: (i) metal, such as aluminum or steel, (ii) a polymer material, such as plastic, (iii) a magnetic material, or (iv) a combination of the prior material. The housing 200 can be made from various materials (e.g., plastic, metal, etc.) and may be made using any suitable technique (e.g., injection molding, 3D printing, etc.). In certain embodiments, part of the housing 200 (e.g., the first body 210 and the second body 220) may be made from one material (e.g., metal), and another part of the housing 200 (e.g., cover 276) may be made from a second material (e.g., plastic). The housing 200 including the cover 276 and the button 332 are designed to protect the electronic package 300 from external solid, liquid, and/or gaseous matter, which in some embodiments allows the housing 200 and the device 10 to be substantially waterproof (e.g., the device 10 meets the ip67 or ip68 standards).

Lighting Element

The lighting element 100 includes a flexible LED array 110 and a coupling portion 140 configured to couple the lighting element 100 to the housing 200. The coupling portion 140 includes a pivot portion 142*a* and a pivot portion 142*b* that, when assembled to each other, form a structure that is analogous to an axle that is partly retained within a pair of apertures 144 defined in the front portion 203.

The flexible LED array 110 includes a light source 302 coupled to a flexible backing support member configured as a base strip 112. The flexible LED array 110 includes a central array region 130, two flexible and deformable lighting panels 120 extending outward therefrom, and opposing end portions 114. The coupling portion 140 is pivotably coupled to the housing 200 within the cavity 213. Each of the flexible panels 120 of the flexible LED array 110 are configured to bend, flex, and/or deform to be received into respective securement recesses 260 of the side edge walls 250.

In some embodiments, the flexible LED array 110 can be configured as an elongate member (where its length (or width) substantially exceeds its height, when viewed in a front plan view), such as strip or as a panel. In some embodiments, the flexible LED array 110 can include joints defined between the central array region 130 and said flexible panel 120. In such examples, the flexible LED array 110 can be configured to bend at the joints. The flexible LED array 110 is fixed to the coupling portion 140 at the central array region 130 of the base array 112 such that the light source 302 is facing outward from the housing 200. The coupling portion 140 includes a pivot portion 142*a* and a pivot portion 142*b* that, when assembled to each other, form a structure that is analogous to an axle that is partly retained within a pair of apertures 144 defined in the front portion 203.

The light source 302 may be affixed to or embedded in the base array 112. The LED array 110 has a width substantially the same as the distance between the first and second face walls 212, 222. The base strip 112 can be made of a flexible or deformable material, such as metal or some polymers. The base strip 112 is configured to be bent, curved, flexed, deformed, or otherwise permit a user to alter the shape of the light source 302 through application of a deformation force by the user to the light source 302 (e.g., it can be bent by hand), and then substantially retain a deformed state after the user stops applying the deformation force. Alternatively, base strip 112 can include a hinged substrate configured to bend the flexible panel 120 at joints in one direction with respect to the central array region 130. The flexible LED array 110 is configured to fold at the over the front rounded corners 252 to retract to the compact state and extend outward toward or away from the sides 206 of the housing 200. The flexible LED array 110 is also configured to be deformed into a stowed configuration in which the flexible panels 120 and the opposing end portions 114 are retained within the secure recesses 250, 260, adjacent to the face walls 212, 222. As such, the light source 302 is capable of being pivoted into multiple angles relative to the body 200, and can be bent into and retain its configuration after a user applies a deformation force to the lighting element. Such combinations of configurable pivot configurations and deformed deployment configurations allows the lighting device 10 to be used in multiple use configurations.

In the illustrated example, the LED array 110 is shown as a collection of three panels or arrays of illuminators, each having a collection of COB LEDs affixed to the base strip 112. In some embodiments, the LED array 110 can be a continuous, bendable lighting element. In some embodiments, the LED array 110 can include multiple discrete illuminators that are directly visible or may be covered by a translucent diffuser that can make the multiple lights have a substantially continuous and uniform luminous appearance. In some embodiments, the LED array 110 may be replaced by other forms of illuminators, such as incandescent lights, electroluminescent lights, laser illuminators, or combinations of these and any other appropriate form of light source.

Electronics Package

The electronics package 300 contained within the housing 200 of the wearable light 10 includes electronic components that are configured to control the operation mode of the light source 302. In connection with certain operation modes, the electronic components will emit light from the LED array 110 accordingly. The electronics package 300 includes the power source 320 and a light source PCB 310.

The light source PCB 310 is configured to supply power to the light source 310. For example, the light source PCB 310 may be configured to only illuminate a percentage of the emitters contained within the light source 310. For example, a user may be able to select the desired individual emitters that the user wants to illuminate, while keeping other individual emitters unilluminated, which can vary the brightness of the emitted light. In another embodiment, the light source PCB 310 may only supply a limited amount of power to all or a subset of the emitters. Lowering the suppled power will reduce the light that is emitted from the light source 310.

The light source 312 may be formed from various different types of emitter assemblies. For example, the light source 312 may be comprised of: (i) a standard LED, (ii) organic LED, (iii) induction light panel, (iv) silicon quantum dot phosphor (SiQD-phosphor), or (v) surface-mount device LED. In addition, different color emitters (e.g., red, green, blue) may be contained within the light source 312. Specifically, the light source 312 may be composed of between 1 and 60 individual emitters, preferably between 10 and 40 individual emitters, and most preferably between 15 and 30 individual emitters. In some embodiments, every individual emitter of light source 312 is configured to illuminate when power is applied to the light source 312 through switch 330. The primary light source 312 may produce between 0 and 3000 lumen, preferably between 0 and 1000, and most preferably between 0 and 300.

The light source PCB 310 is configured to supply power to the light source 310. For example, the light source PCB 310 may be configured to only illuminate a percentage of the emitters contained within the light source 310. For example, a user may be able to select the desired individual emitters that the user wants to illuminate, while keeping other individual emitters unilluminated, which can vary the brightness of the emitted light. In another embodiment, the light source PCB 310 may only supply a limited amount of power to all or a subset of the emitters. Lowering the suppled power will reduce the light that is emitted from the light source 302.

The control PCB 310 includes a charging/discharging port 340, which meets the USB-C standard. Meeting this standard allows the light 10 to: (i) receive electrical current from an external source (110 v wall outlet) in order to charge the internal power source 320 and (ii) supply electrical current from power source 320 to an external device such as a mobile phone. In other embodiments, the charging/discharging port 340 may only be a charging port or may only be a discharging port. For example, port 340 may take the form of a micro-USB port, which can only receive electrical current from an external supply and cannot discharge current to charge an external device. In an alternative embodiment, port 340 could be removed and the power source 320 could recharge through wireless recharging mechanisms or could provide power to an external device wirelessly. In yet another alternative embodiment, port 340 could be removed and the power source 320 could recharge through a photovoltaic panel arranged on one or more surfaces of the wearable light 10.

The switch 330 of the wearable lighting device 10 enables the user to alter the operational mode of the flexible LED array 110. This is done by altering the current that can pass from the power source 320 to flow to the flexible LED array 110 to illuminate or turn "On" the flexible LED array 110. In an example, the user: (i) may depress the switch 330 one time to turn "On" the flexible LED array 110, (ii) may depress the switch 330 two times to turn "Off" the flexible LED array 110, or (iii) may depress the switch 330 three times to place the flexible LED array 110 in a flashing or emergency mode. In some embodiments, the user may depress the switch 330 for a predetermined time and/or with a predetermined pattern of presses to adjust the emitted brightness and/or color of the light emitted by the flexible LED array 110. It should also be understood that switch 330 may be replaced with an assembly that is configured to utilize switches, sliders, or sensors physically coupled to the lighting element 100 (e.g., motion, light, sound, or heat). In other embodiments, the switch 330 may be replaced with an assembly that is configured to connect to any of the following devices using wired (802.11, FireWire, etc.) or wireless protocols (e.g., Bluetooth, Wi-Fi, NFC, etc.): (i) sensors (e.g., motion, light, sound, or heat) that are positioned at a distance from the wearable lighting device 10 or (ii) other devices (e.g., cell phone, laptop, RF remote control, etc.).

The power source 320 is configured to provide current to the flexible LED array 110. In particular, the power source 320 may be a non-removable, rechargeable battery. In other embodiments, the power source 320 may be a removable non-rechargeable battery, a removable rechargeable battery, a combination of removable rechargeable batteries, a combination of removable rechargeable batteries disposed within a battery cartridge, a combination of non-removable rechargeable batteries disposed within a battery cartridge, a DC power supply that is configured to connect to a 12-volt car battery, a DC power supply that is configured to connect to a 110-volt alternative current outlet, or any other type of power supply that is known to a person of skill in the art.

Attachment Means and Usage

Figure 15:
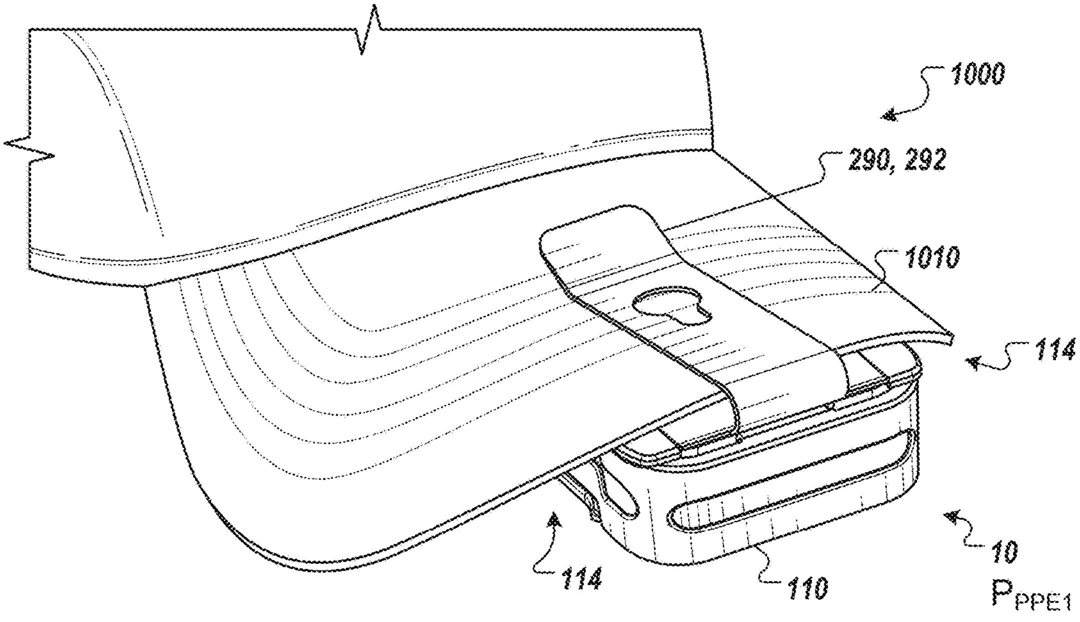
FIG. 15 is a front perspective view of the wearable light of FIG. 1 removably affixed to a brim of a baseball hat via the attachment mechanism, showing the lighting element and the panels in a first partially extended position $P_{PPE1}$ that includes three angular segments of the lighting element.
Figure 16:
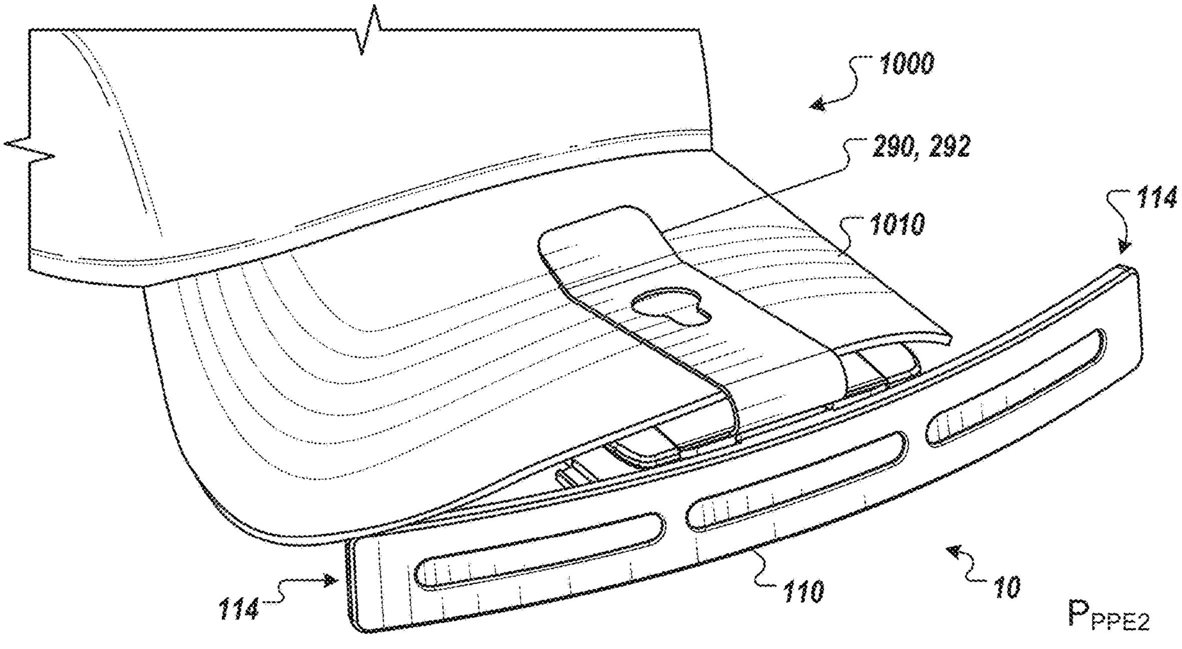
FIG. 16 is a front perspective view of the wearable light of FIG. 1 removably affixed to a brim of a baseball hat via the attachment mechanism, showing the lighting element and the panels in a second partially extended position $P_{PPE2}$ that includes three angular segments of the lighting element.

In the figures, the attachment means 290 is shown as a clip 292 coupled to the first face wall 212 of the housing 200, which allows a user to releasably couple the wearable light 10 to clothing or other wearable or non-wearable items. The first flat outward facing surface 214 considered the attachment side of the device 10. Although shown as a curvilinear clip 292, the attachment means 290 may be an adhesive member, hook, magnetic coupler, hook and look fastener, or any other type of fastener that is designed to removably couple the wearable light 10 to an item. As shown in FIG. 15, the wearable light 10 is adapted to connect or attach to a brim 1010 of a hat 1000 (e.g., a baseball or trucker cap), worn by a user of the wearable light 10, in a partially deployed position to illuminate the path in front of the user as well as to the sides. As shown, the end portions 114 of the LED array 110 can be positioned under the lower surface of the brim 1010 of the hat 1000 with at least a portion of the clip 292 extending over the brim 1010. As shown in FIG. 16, the wearable light 10 can be attached to the brim 1010 of the hat 1000 in a deployed position to illuminate the path in front of the user, maximizing the direction of illumination. As shown, the end portions 114 of the LED array 110 can be positioned forward of the brim 1010 and/or touching the brim 1010. As shown in FIG. 4, the LED array 110 can be pivoted to an intermediate angled position to illuminate the forward path and some of the downward direction. Additionally, the LED array 110 can be selectively pivoted by the user to a fully pivoted position (FIG. 5) to illuminate the downward direction. For example, it may be desirable to illuminate the downward direction when a user is focusing attention on an object directly beneath the user. Thus, the LED array 110 can be selectively pivoted in a range of pivot angles varying between approximately 0 and approximately 90 degrees, as defined by an uppermost surface 140*a* of the coupling portion 140, where the orientation of the uppermost surface 140*a* in FIG. 2 defines 0 degrees.

Although shown attached to the hat 1000, the wearable light 10 can also be attached to other articles of clothing or other wearable or non-wearable items with the LED array 110 positioned according to the need. For example, the wearable light 10 positioned in the fully pivoted position may be clipped to or inserted into a pocket of a clothing article to illuminate a forward path of the user.

Figure 8:
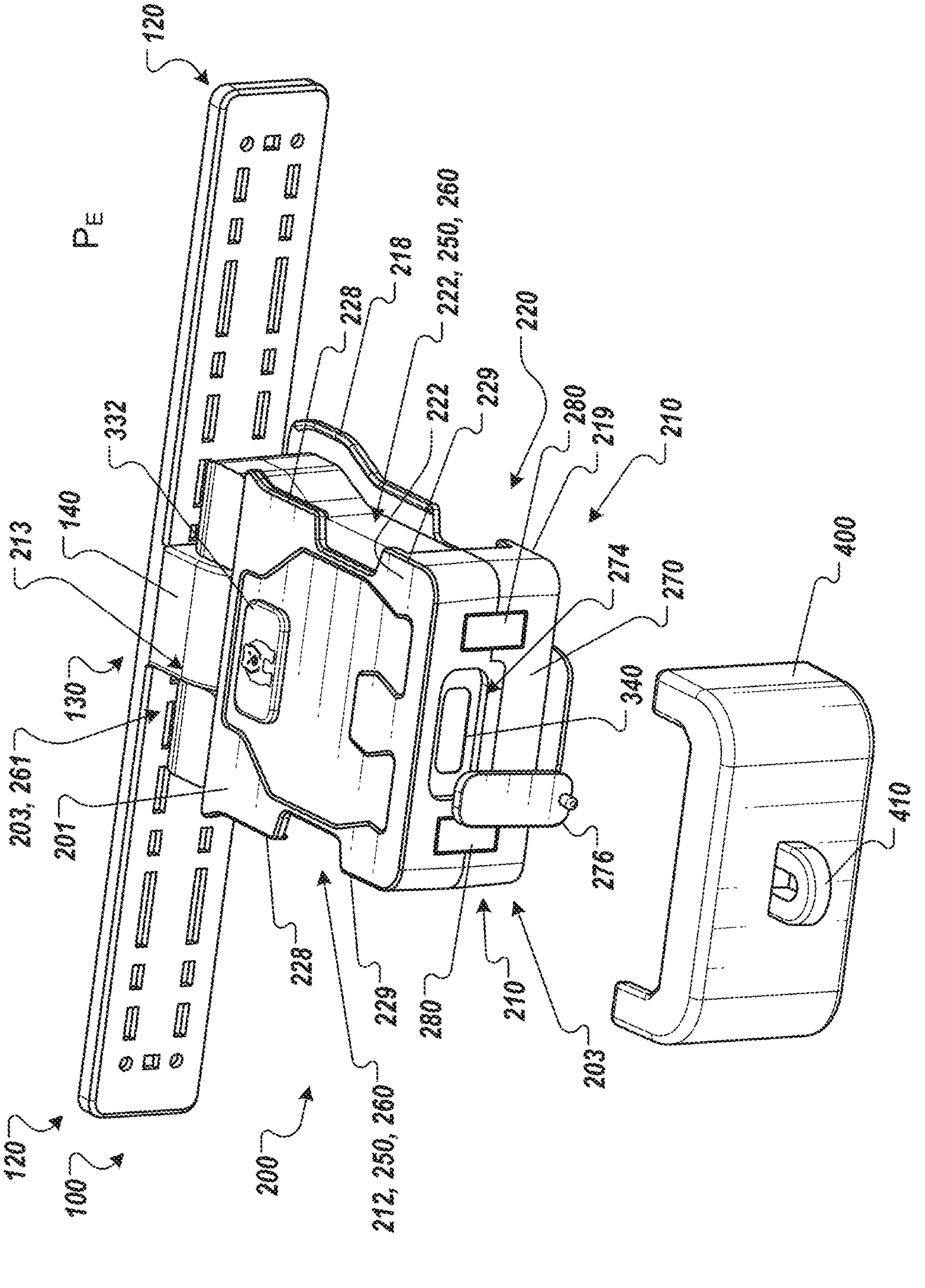
FIG. 8 is a rear perspective view of the portable, wearable lighting device of FIG. 1, showing the lighting element and the panels in the extended position PE and the removable cover removed to expose the charging port and the magnetic securement members.

As shown in FIGS. 8-10, the wearable light 10 includes a collection of magnets 280 arranged in the base portion 270. In use, the magnets 280 can be used to removably affix the wearable light 10 to a magnetic or magnetically reactive support surface (e.g., the underside of a car hood, a vehicle body panel, a toolbox, a steel cabinet, a fence post). In some embodiments, the wearable light 10 can include other removable attachment features, such as suction cups or hook and loop fasteners to allow the user to temporarily affix and position the wearable light 10 to a surface or object for use or storage.

The wearable light 10 also includes a detachable endcap 400. When coupled to the body 200, the endcap substantially encloses the base portion 270 and the USB charging port 340. The endcap 400 includes a loop 410. In some embodiments, the loop 410 can be used to removably affix the endcap 400 to a lanyard, tether, keychain, keyring, or any other appropriate accessory. The endcap 400 also includes a magnetic plate 420 configured to be magnetically attracted to the magnets 280. In use, the magnetic plate 420 removably couples the detachable endcap 400 to the body 200. For example, the wearable light 10 can be hung from a lanyard, and when the user needs light the user can simply give the wearable light 10 a tug to magnetically detach the body 200 and the deployable lighting element 100 from the detachable endcap 400 and the tether. When done, the user can simply insert the body 200 back into the detachable endcap 400 to be stowed for future use. In some embodiments, with the detachable endcap 400 in place, the magnets 280 can also be prevented from unintentionally attaching to or unintentionally attracting other magnetically reactive objects (e.g., metal objects in a pocket, a car door as the user enters or exits a vehicle).

Headings and subheadings, if any, are used for convenience only and are not limiting. The word exemplary is used to mean serving as an example or illustration. To the extent that the term includes, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

Numerous modifications to the present disclosure will be apparent to those skilled in the art in view of the foregoing description. Preferred embodiments of this disclosure are described herein, including the best mode known to the inventors for carrying out the disclosure. It should be understood that the illustrated embodiments are exemplary only, and should not be taken as limiting the scope of the disclosure.

The invention claimed is:

1. A portable lighting device capable of being used in multiple use configurations, the portable lighting device comprising:

- a housing including a top wall, a bottom wall, a front portion, a rear portion opposite the front portion, and opposed side portions extending between the front and rear portions, each side portion including a securement recess;
- an adjustable, deployable lighting element including (i) a flexible LED array affixed to a flexible backing support member and (ii) a coupling support extending from a central portion of the flexible backing support member;
- an electronics package including a power source contained within the housing and operably coupled to said lighting element;
- an attachment means coupled to the housing, wherein the attachment means is adapted to connect with a brim of a hat worn by a user of the portable lighting device; and
- wherein in a retracted position, end portions of said lighting element are received in respective securement recesses of the housing to define a compact state $S_C$.

2. The portable lighting device of claim 1, wherein in the compact state $S_C$, end portions of both the LED array and the flexible backing support member are received in respective securement recesses of the housing.

3. The portable lighting device of claim 1, wherein said lighting element is deployable by the user from the compact state Se to a first deployed state $S_{D1}$, wherein the end portions of said lighting element are removed from the securement recesses and said lighting element is deployed into a substantially linear configuration.

4. The portable lighting device of claim 3, wherein the coupling support is pivotably coupled to the front portion of the housing, and wherein in the first deployed state $S_{D1}$, the lighting element is pivotably adjustable between an initial angular position and a fully pivoted angular position,

- wherein in the initial angular position, the lighting element directs emitted light substantially forward and in the fully pivoted angular position, the lighting element directs emitted light substantially downward.

5. The portable lighting device of claim 4, wherein a pivot angle of approximately 90 degrees is defined between the initial angular position and the fully pivoted angular position.

6. The portable lighting device of claim 1, wherein said lighting element is deployable by the user from the compact state $S_C$ to a second deployed state $S_{D2}$, wherein the end portions of said lighting element are removed from the securement recesses and said lighting element is deployed into a curvilinear configuration.

7. The portable lighting device of claim 6, wherein the coupling support is pivotably coupled to the front portion of the housing, and wherein in the second deployed state $S_{D2}$, the lighting element is pivotable between an initial angular position and a fully pivoted angular position,

- wherein in the fully pivoted angular position the lighting element directs emitted light substantially downward.

8. The portable lighting device of claim 7, wherein a pivot angle of approximately 90 degrees is defined between the initial angular position and the fully pivoted angular position.

9. The portable lighting device of claim 1, wherein the flexible LED array includes Chip on Board ("COB") light emitting diodes.

10. The portable lighting device of claim 1, further comprising a charging port located in the rear portion of the housing and operably coupled to the power source.

11. The portable lighting device of claim 10, wherein the rear portion of the housing includes at least one magnet configured to removably affix the portable lighting device to a support surface, and wherein the rear portion also includes a removable cover that encloses both of the charging port and the at least one magnet.

12. A portable lighting device that can be removably affixed to an article of clothing worn by a user, the lighting device comprising:

- a housing including: (i) a top wall, (ii) a bottom wall, (iii) a front portion, (iv) opposed side portions extending between the top and bottom walls, and (v) an electronics package including a power source;

a flexible LED lighting element operably connected to the power source, said lighting element including a pivotable coupling support extending from a central portion of said lighting element, wherein the coupling support is pivotably coupled to the front portion of the housing;

an attachment means coupled to the housing, wherein the attachment means is adapted to be removably affixed to an article of clothing worn by a user of the portable, wearable lighting device;

wherein in a retracted position, a first end portion of said lighting element is received in a first securement recess in a first side portion of the housing, and a second end portion of said lighting element is received in a second securement recess in a second side portion of the housing, to collectively define a compact state $S_C$; and, wherein said lighting element and the pivotable coupling support provide the lighting device with two degrees of freedom of adjustment during operation of the lighting device.

13. The portable lighting device of claim 12, wherein in the compact state $S_C$, an intermediate portion of said lighting element is received within a frontal securement recess formed in the front portion of the housing.

14. The portable lighting device of claim 13, wherein in the compact state $S_C$, said lighting element has a substantially U-shaped configuration when observed in top view of the portable, wearable lighting device.

15. The portable lighting device of claim 12, wherein said lighting element is deployable by the user from the compact state Se to a first deployed state $S_{D1}$, wherein the first and second end portions of said lighting element are removed from the first and second securement recesses.

16. The portable lighting device of claim 15, wherein in the first deployed state $S_{D1}$, said lighting element is pivotably adjustable between an initial angular position and a fully pivoted angular position, wherein in the fully pivoted angular position, the lighting element directs emitted light substantially downward.

17. The portable lighting device of claim 16, wherein a pivot angle of approximately 90 degrees is defined between the initial angular position and the fully pivoted angular position.

18. The portable lighting device of claim 12, wherein said lighting element includes a flexible LED array affixed to a flexible backing support member that substantially retains its configuration after a user applies a deformation force to the lighting element, and wherein the coupling support (i) extends from a central portion of the flexible backing support member, and (ii) is pivotably coupled to a cavity formed in the front portion of the housing.

19. The portable lighting device of claim 18, wherein the cavity is aligned with a frontal securement recess formed in the front portion of the housing, and wherein in the compact state $S_C$, an intermediate portion of said lighting element is received within the frontal securement recess.

20. The portable lighting device of claim 18, wherein the flexible LED array includes Chip on Board ("COB") light emitting diodes.

21. The portable, wearable lighting device of claim 12, further comprising a charging port located in the rear portion of the housing and operably coupled to the power source.

22. The portable, wearable lighting device of claim 12, wherein the rear portion of the housing includes at least one magnet configured to removably affix the wearable lighting device to a support surface, and wherein the rear portion also includes a removable cover that encloses both of the charging port and the at least one magnet.

* * * * *